Aug. 23, 1966     A. F. OATLEY     3,267,925
GRILLING APPLIANCES

Filed Aug. 31, 1964     2 Sheets-Sheet 1

Aug. 23, 1966  A. F. OATLEY  3,267,925
GRILLING APPLIANCES
Filed Aug. 31, 1964  2 Sheets-Sheet 2

UNITED STATES PATENT OFFICE 3,267,925
Patented August 23, 1966

3,267,925
GRILLING APPLIANCES
Arthur Frederick Oatley, Wilton Lodge, Wergs Road,
Tettenhall, Wolverhampton, England
Filed Aug. 31, 1964, Ser. No. 393,114
7 Claims. (Cl. 126—41)

This invention relates to gas or electrically heated grilling appliances.

The present invention consists in a gas or electrically-heated grilling appliance wherein a radiant is mounted on a supporting structure in a horizontal forwardly extending position-of-use in which it is supported in cantilever fashion from the rear and from which it can be released by movement including bodily forward movement to enable it to be swung down into a vertical stored position.

The invention further consists in a gas or electrically-heated grilling appliance wherein a radiant is mounted on a supporting structure by a pivot permitting some freedom of horizontal forward and rearward movement of the radiant and in its rearward position downward angular movement of the radiant about the pivot is prevented by interengaging portions of or on the radiant and supporting structure and the radiant is supported by the pivot and interengaging portions in cantilever fashion from the rear in a forwardly extending position-of-use but in the forward position of the radiant the interengaging portions disengage to allow pivotal movement about the pivot so that the radiant can be swung down into a vertical stored position.

The radiant may be at a fixed height but there is a particular advantage in the application of the invention to a grilling appliance in which the radiant is vertically movable to vary its height and its distance from a food support shelf or a spit. The cantilever mounting on, for example, the upper ends of vertically slidable uprights allows a wide range of vertical movement without interference from struts, or side supports.

In both fixed and variable height grilling appliances a food-support shelf below the radiant can be hinged along its rear edge so that it can be swung up, after the radiant surface has been moved to the stored position, and cover the radiant surface.

In an electrically-heated grilling appliance according to the invention, in order to avoid the risk of damage or injury through the heating of the radiant in the stored position, an isolating device may be provided and actuated automatically by the folding movement. For example, in an electrically-heated appliance a micro-switch may be mounted on the supporting structure and be actuated directly or through a cam by the movement of the radiant or the food support shelf.

An embodiment of the invention will now be described by way of example with reference to the accompanying drawings in which, FIGURE 1 is a small general perspective view of a cooker having spaced above its hotplate a grill which includes a radiant mounted in accordance with the present invention.

Figure 1:
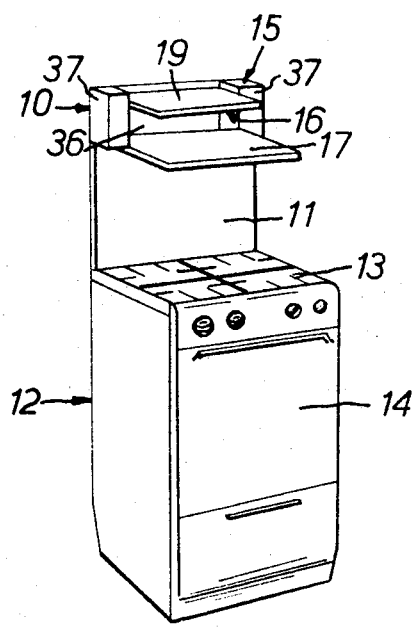

In this embodiment the invention is applied to an electrically-heated grilling appliance 10 which is mounted above a splashback 11 of a cooker 12, FIGURE 1, and is spaced above a hotplate 13 of the cooker at eye-level. The hotplate 13 is provided above an oven 14.

Figure 2:
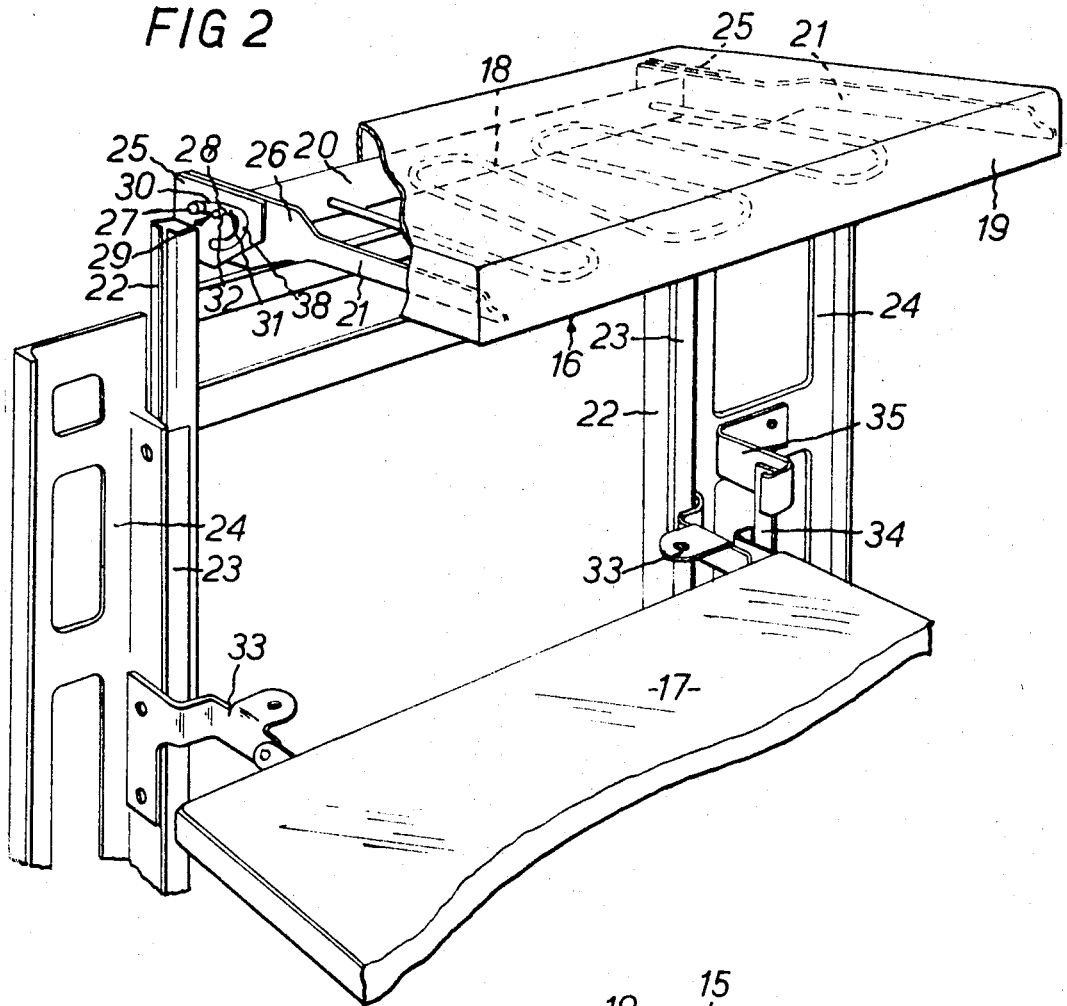
FIGURE 2 is a front perspective view of the grill showing its basic construction.

The grilling appliance comprises a supporting structure 15, a radiant 16 which can be moved between a vertical stored position within the supporting structure 15 and a horizontal position-of-use in which it extends forwardly in cantilever fashion from the top of the supporting structure, and a food support shelf 17 which is movable between a vertical stored position in which it is closed against and in front of the radiant 16 when stored, and a horizontal position-of-use in which it extends forwardly in cantilever fashion from the bottom of the supporting structure. Referring to FIGURE 2 which shows the grilling appliance in its in-use condition, the radiant 16 is downwardly directed and formed by an element 18 of the tubular sheath type which is looped in serpentine fashion backwards and forwards along the length of a sheet metal cover 19 provided over and around the element 18. The ends of the element 18 are carried along a cross-member 20 extending below the cover 19 parallel and close to the rear edge of the cover. The ends of the element are connected by flexible leads, not shown, to the electric supply through a switch, not shown, in the supporting structure 15. The cross-member 20 is secured at the ends to, and links, parallel arms 21 at each side of the cover 19 which they support.

The radiant in addition to being movable between the horizontal and vertical positions can also be moved relative to the support between adjusted horizontal positions in which it is at varying distances from the shelf 17.

The arms 21 supporting the cover 19 are mounted, in a way which will subsequently be described, at their rear ends on the upper ends of two spaced parallel columns 22 of generally channel section each of which is vertically slidable in an upright channel member 23 formed integrally with a frame member 24 of the supporting structure. Rigidly secured to and extending forward from the upper end of each column 22 is a bracket 25. The depth of each arm 21 is increased slightly at its rear end portion 26 and cranked inwards of the remaining portion of the arm to extend along the inside of the adjacent bracket 25. Close to the rear end of each arm 21 there is secured a laterally outwardly projecting trunnion 27 and slightly forwards of the trunnion 27 there is secured a laterally outwardly projecting support pin 28 smaller in diameter than the trunnion. The trunnion 27 and support pin 28 engage a slot 29 in the bracket 25, as shown clearly in FIGURE 4. The slot 29 has a horizontal portion 30 which is just long enough to receive both the trunnion and support pin when the radiant is horizontal and to permit some freedom of horizontal forward and rearward movement of the radiant. At the forward end of the horizontal portion 30 the slot has a narrow entry portion 31. The trunnion 27 can slide backwards and forwards along the horizontal portion 30 of the slot but it cannot pass into the narrow entry 31. The support pin 28 can pass through the narrow entry 31 into an extension including an arcuate portion 38.

Figure 4:
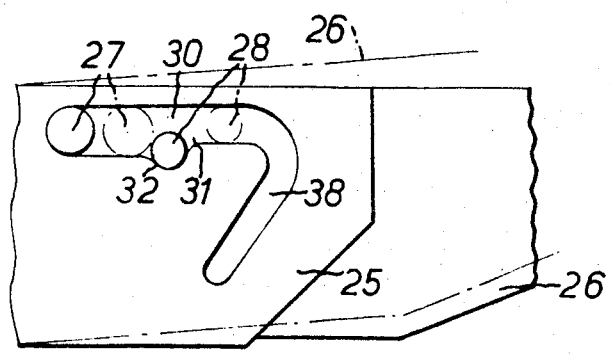
FIGURE 4 is an enlarged detail view of interengaging means between the radiant and a supporting structure of the grill.

When the radiant is in its horizontal position-of-use it is also in its extreme horizontal rearward position in which the trunnion 27 and support pin and both engaged in the horizontal portion 30 of the slot 29, as shown in full lines in FIGURE 4. In order to resist inadvertent forward movement of the radiant the support pin 28 in this rearward position of the radiant engages a recess 32 in the lower edge and at the forward end of the horizontal portion 30.

Figure 3:
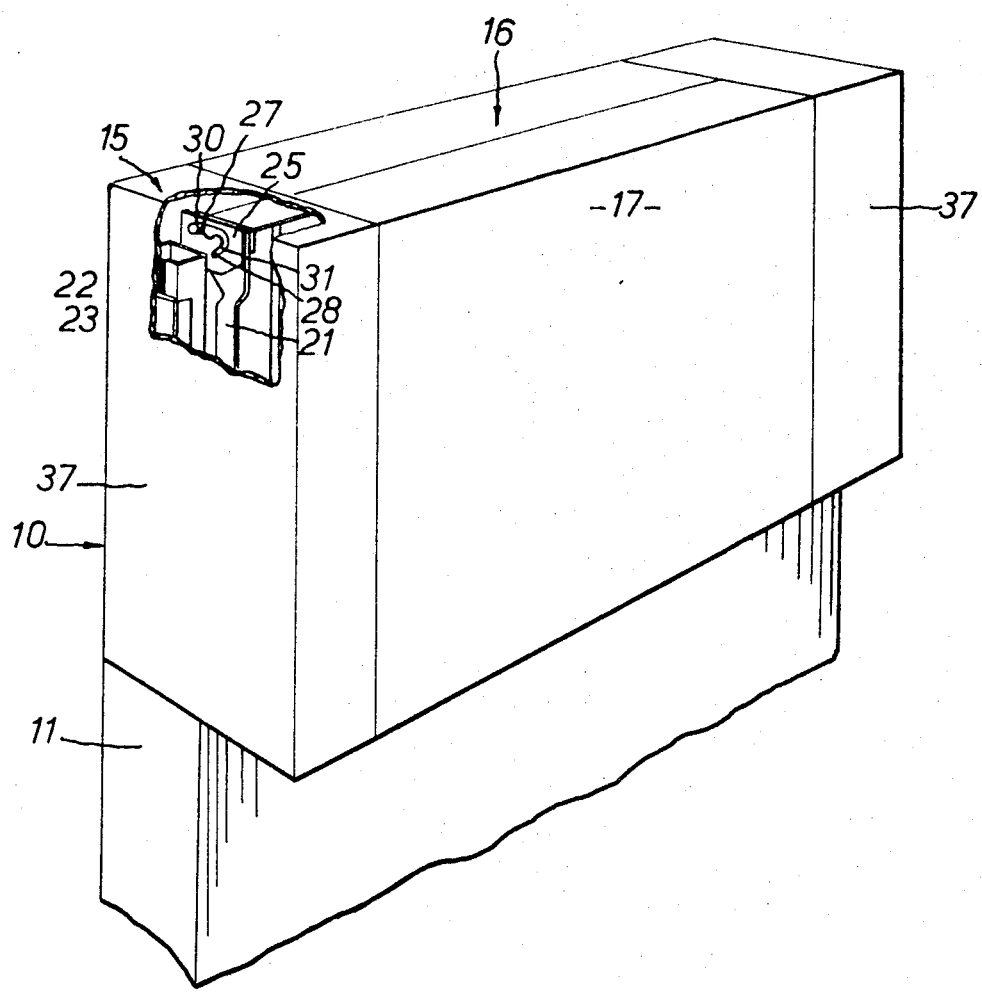
FIGURE 3 is a front perspective view of the grill in its folded condition being partly broken away to show otherwise hidden construction detail.

To release the radiant from its horizontal in-use-position it is lifted slightly to raise the support pin 28 clear of the recess 32, as indicated in broken lines in FIGURE 4, and then drawn horizontally forwards to draw the support pin through the entry 31 into the extension and until it is above the arcuate portion 38. The radiant can then be swung downwards, pivoting about the trunnions 27, to its vertical stored position in the supporting structure, as shown in FIGURE 3. As the radiant is swung downwards the support pin enters into and moves along the arcuate portion 38.

It will be understood that there are various other ways in which the arms 10 and columns 22 may be connected to permit movement of the radiant between its horizontal position-of-use and vertical stored position in accordance with the present invention. For example the arms may each be formed with a slot which is engaged by a trunnion and support pin on the column or bracket on the column. As an alternative to the arrangement described and illustrated the narrow entry 31 instead of having an extension may extend horizontally from the forward end of the horizontal portion 30 of the slot and open through the forward edge of the bracket. Thus when the radiant is moved horizontally forwards the support pin moves out of the entry clear of the forward edge of the bracket and as the radiant is swung downwards to its vertical stored position the support pin moves along the edge of the bracket which could be suitably arcuately formed accordingly.

Although not shown in the drawings, an isolating switch is provided in the supporting structure which is actuated by movement of the radiant to its stored position to cut off the supply of electricity to the element 18 to prevent heating of the radiant when the appliance is folded.

The food support shelf 17, as shown in FIGURE 2, at its edge which is at the rear when the shelf is horizontal is pivotally mounted about a horizontal axis on brackets 33 secured to each of the upright channel members 23. When the radiant has been swung down into its stored position the shelf 17 can be swung upwards about its pivotal axis to cover the radiant, as shown in FIGURE 3. A stop 34 is mounted on the shelf at one side which when the shelf is horizontal engages a hooked arm 35 secured to one of the frame members 24 of the supporting structure and prevents further downward movement of the shelf beyond its horizontal position. If desired the isolating switch can be arranged to be actuated by closing movement of the shelf 17 instead of the radiant to cut off the electricity supply to the element 18.

The radiant and food support shelf fold into a recess 36, FIGURE 1, between hollow pillars 37, FIGURES 1 and 3, forming part of the supporting structure which may house the controls for the appliance and the control for height adjustment of the radiant. A foldable spit driving motor may be housed in one of the pillars or one of the pillars may be arranged to support a detachable spit driving motor, in either case the control for the motor may also be provided in or on one of the pillars 37.

I claim:

1. A grilling appliance comprising in combination:
a supporting structure forming the rear of the appliance;
carrier means vertically movable on said supporting structure;
a radiant;
heating means for said radiant;
a pivot swivelly mounting said radiant on said carrier means and adapted to permit limited horizontal movement between forward and rearward positions of said radiant with respect to said supporting structure;
and interengageable elements respectively associated with said radiant and said supporting structure and engaging one with the other in said rearward position so as to prevent downward angular movement of said radiant about said pivot and, in combination with said pivot, to support said radiant in cantilever fashion from the rear in a forwardly extending position-of-use, said interengageable elements disengaging one from the other in said forward position to allow pivotal movement about said pivot so that said radiant can be swung down into a vertical stored position.

2. A grilling appliance as defined by claim 1 wherein in the rearward position said interengaging element associated with said radiant is engageable by downward movement behind said interengaging element associated with said supporting structure so that said interengaging elements interlock in the rearward position and resist inadvertent forward movement of said radiant, said interengaging elements being released from their interlocking condition by upward angular movement of said radiant.

3. A grilling appliance comprising in combination:
a supporting structure forming the rear of the appliance;
a radiant;
means carried by said radiant for heating said radiant;
arms extending forward from said supporting structure and carrying said radiant;
a bracket associated with each said arm and supported by said supporting structure;
means supporting each said arm and associated bracket, said means including a trunnion and a support pin projecting laterally from one and engaging a slot in the other, said slot having a horizontal portion sized to receive both said trunnion and support pin in the rearward position;
and means defining an entry to said slot adjacent said support pin, sized to allow said support pin to pass but preventing passage of said trunnion, said support pin after leaving said slot by said entry on forward bodily movement of said arm being permitted freedom for downward pivotal movement of said arm about said trunnion.

4. A grilling appliance according to claim 3 wherein said support pin and a recess in the edge of said slot engage in the rearward position of said radiant.

5. A grilling appliance according to claim 3 wherein said slot includes an extension from said entry including an arcuate portion along which said support pin moves for pivotal movement of said arm about said trunnion.

6. A grilling appliance according to claim 3 wherein said brackets are secured to the upper ends of uprights vertically slidable on said supporting structure.

7. A grilling appliance according to claim 1 wherein a food support shelf is pivotally mounted about a horizontal axis on said supporting structure below said radiant and is capable of being swung up to cover said radiant in the stored position.

References Cited by the Examiner
UNITED STATES PATENTS

| | | | |
|---|---|---|---|
| 2,624,331 | 1/1953 | Kennedy | 126—41 |
| 2,811,628 | 10/1957 | Gottfried | 219—444 |

FREDERICK L. MATTESON, JR., *Primary Examiner.*

E. G. FAVORS, *Assistant Examiner.*